FIG.1

INVENTOR.
MILTON E. SPATT
BY
J.B. Felshin
ATTORNEY.

3,351,129
AIR CONDITIONING SYSTEMS FOR VEHICLES SUCH AS BUSES
Milton E. Spatt, 135 Eastern Parkway,
Brooklyn, N.Y. 11238
Filed Sept. 17, 1965, Ser. No. 488,197
8 Claims. (Cl. 165—30)

ABSTRACT OF THE DISCLOSURE

The invention relates to air conditioning systems which are installed completely under the floor of a bus except for the air distribution system. The high side components are mounted on frames supported by the structural frame of the bus. The existing heating coil of the bus is connected to both the water jackets of the main bus engine and the separate engine for the air conditioner so that exhaust heat carried by the water from the main engine can be used to heat the bus in cold weather. Also, exhaust heat carried by water from the air conditioner engine can be sent to the heating coil for re-heat. Controlled circuits are provided to cause rapid re-cycling of the re-heat, to accurately maintain any desired temperature. Thermostatic means are provided including first stage means to control re-heating and second stage means to unload the air conditioner system compressor to control the amount of refrigeration. High side components are assembled on the main frame and on separate frames which are mounted on a main frame through vibration or shock mounting means. The high side components may be fully assembled at the factory before installation into the bus as a compact package, and may be operated independently of the main vehicle engine, and may be connected into standard buses and be connected into their heating and air distribution systems of standard buses with little alteration.

This application relates to improvements in my copending applications Ser. No. 389,660, filed Aug. 14, 1964, entitled, "Air Conditioning Apparatus for Buses and Other Vehicles, Especially for Arrangement and Support of High Side of Refrigerating System"; and Ser. No. 426,253, filed Jan. 18, 1965, entitled, "Air Conditioning Means for Vehicles."

This invention relates to air conditioning systems for vehicles such as buses.

An object of this invention is to provide an air conditioning system of the character described which is installed completely under the floor of a bus, except for the air distribution system.

Another object of this invention is to provide an air conditioning system of the character described wherein the high side components are pre-assembled on a main frame, and wherein the main frame with the complete high side thereon may be then mounted on the existing structural frame of the bus but without structurally altering the bus frame or weakening the frame, and thereby effecting economies in installation, repair and maintenance of the air conditioning system.

A further object of this invention is to provide an air conditioning system of the character described wherein the main frame is mounted on the bus frame by a pair of hanger brackets, and the high side components are mounted on separate frames which are mounted on the main frame, vibration or shock mounting means being provided between the main frame and the hanger brackets and between the component frames and the main frame.

Still another object of this invention is to provide an air conditioning system of the character described wherein the low side of the air conditioning system is mounted under the floor of the bus, and connection is made from the evaporator blowers to the existing air distribution system of the bus.

Yet another object of this invention is to provide an air conditioning system of the character described wherein the existing heating coil of the bus is connected to both the water jackets of the main bus engine and the separate air conditioner engine so that exhaust heat carried by the water from the main engine can be used to heat the bus in cold weather, or exhaust heat carried by water from the air conditioner engine can be sent to the heating coil for re-heat, whereby the existing heating coil serves as a re-heater for air conditioning purposes; or alternatively, the heating coil is connected only to the water jacket of the main bus engine so that exhaust heat carried by the water from the main bus engine can be sent to the heating coil for heat or re-heat.

A further object of this invention is to provide an air conditioning system of the character described comprising control circuits having means to cause rapid re-cycling of the re-heat, to accurately maintain any desired temperature, and to keep humidity down.

Yet a further object of this invention is to provide an air conditioning system of the character described wherein the air conditioner engine is between the re-heat coil and its own radiator in the path of water flow, so that water will pass through said radiator on its return from the re-heat coil to the engine whereby the water will pick up heat in the radiator before returning to the engine to prevent an excessively large temperature differential between the water and the engine, as could occur if the water were to return directly to the engine from the re-heat coil.

Another object of this invention is to provide an air conditioning system of the character described having a separate electric generator driven by the air conditioner engine, whereby the air conditioning system may be operated independently of the main vehicle engine electrical system, with the exception of the small amount of current taken from the main vehicle electrical system for the air conditioner system control circuits.

Yet another object of this invention is to provide an air conditioning system of the character described wherein the water jacket of the separate air conditioner engine is connected to only its own radiator, and the connections between the main vehicle engine water jacket and the heat/re-heat coil are provided with means controlled by the air conditioner control circuits to selectively supply heated water for re-heating for air conditioning purposes.

A further object of this invention is to provide an air conditioning system of the character described including control circuits including two stage thermostatic means to control passenger compartment temperature within a pre-determined range of a selected temperature.

Still a further object of this invention is to provide an air conditioning system of the character described wherein said thermostatic means include first stage means to control re-heating, and second stage means to unload the air conditioner system compressor to control the amount of refrigeration.

Yet a further object of this invention is to provide an air conditioning system of the character described which shall be simple to install in a vehicle wholly below the floor thereof, which may be substantially fully assembled and tested at the factory before installation into the bus as a compact package, which may be operated independently of the main vehicle engine, which may be incorporated into standard buses and connected into their heating and air distribution systems wtih little or no alterations of such buses being required, which shall be economical to manufacture, insure against shock, sway and pitch motion damage to the component, and yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

In the accompanying drawings, in which are shown various illustrative embodiments of this invention.

Figure 1:
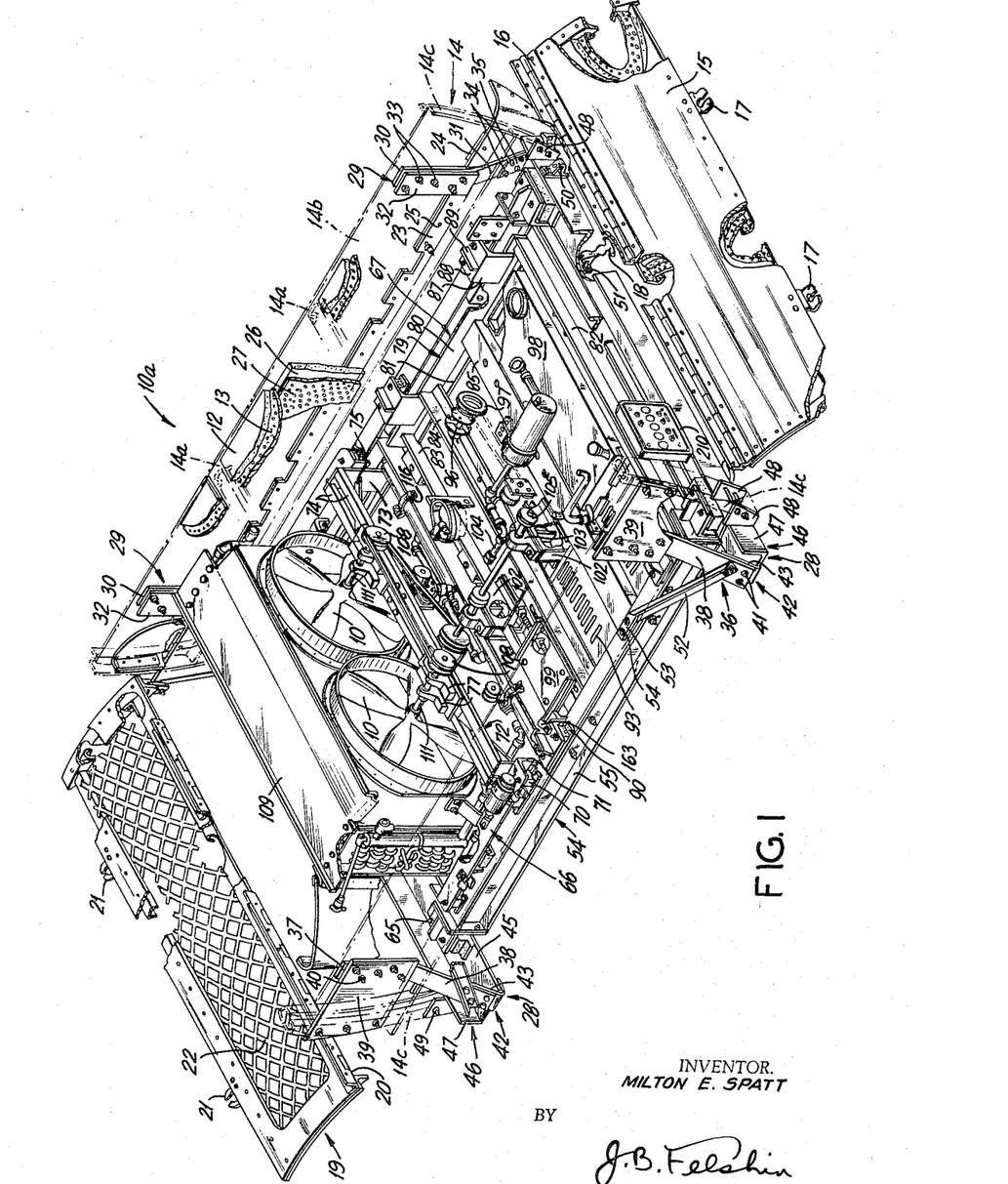
FIG. 1 is a perspective view of the air conditioner high side shown mounted under the floor of a bus looking from the right side of the bus towards the left and towards the front, with some parts and components broken away, in cross-section or removed.
Figure 2:
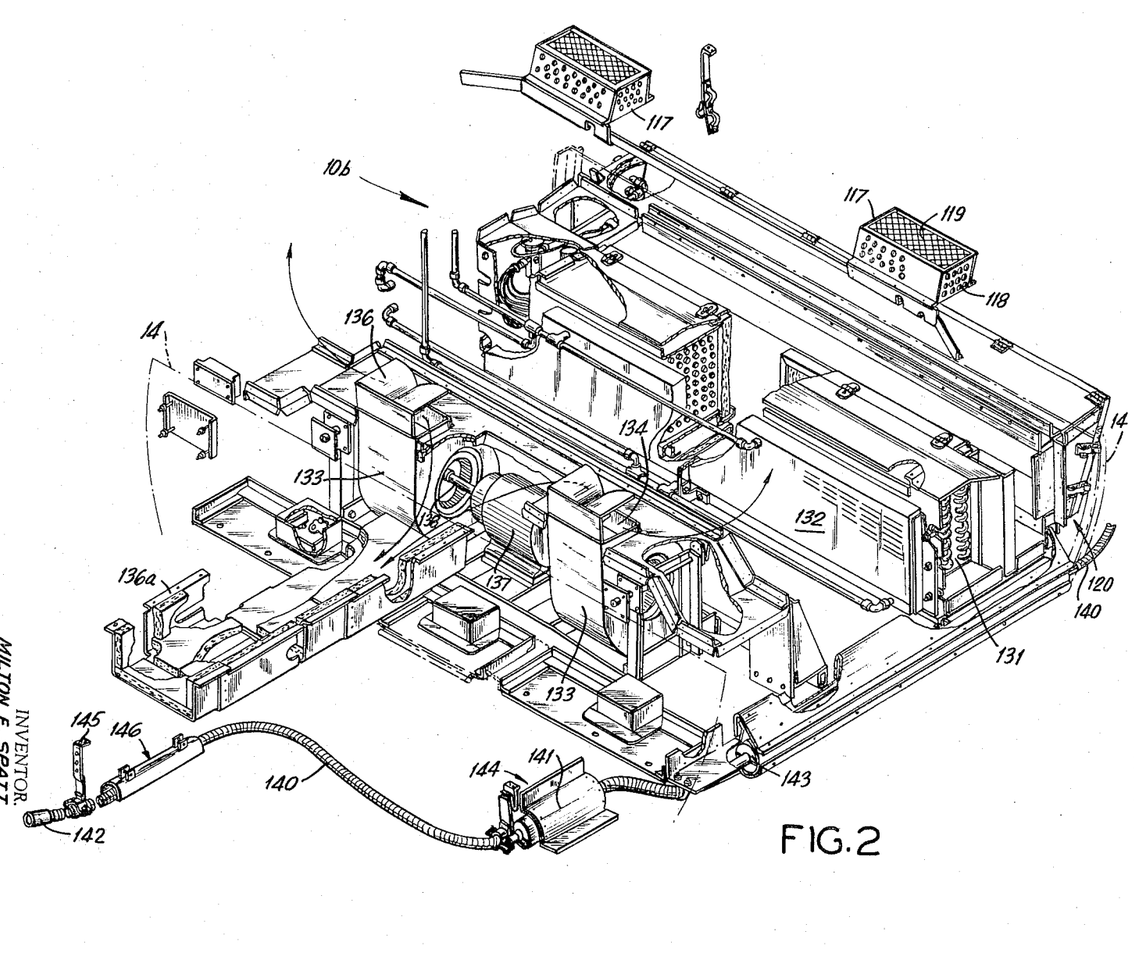
FIG. 2 is a perspective view of the air conditioner low side shown mounted under the floor of a bus looking at the angle of FIG. 1 but further towards the rear of the bus.

Referring now in detail to the drawings, the air conditioning system 10 comprises a high side 10a, FIG. 1, and a low side 10b, FIG. 2. Air conditioner 10 may be mounted under the floor 11 of a bus or other vehicle. The floor 11 is provided at its underside with an insulation sheet 12, and an insulation support sheet 13, see FIG. 1. The underfloor structure of the bus is conventional and comprises a plurality of cross members 14. These cross members 14 divide the understructure of the bus into sections or bays. Usual frame members 14a run longitudinally of the bus, traverse the frame members 14, and support the floor 11. Each cross member 14 comprises a cross web 14b and a pair of end struts 14c.

The high side 10a is mounted in one of these bays, and the low side 10b is mounted in another, the high side being in front of the low side in the bus.

The right side of the bus, adjacent the high side bay, is provided with an insulated solid door 15 which is hinged to the body of the bus at its top edge by a hinge 16 in a well known manner. The lower edge of door 15 is provided with a pair of bifurcated latch members 17 which cooperated with rubber door hooks 18 to releasably latch the door closed in a conventional manner. Hooks 18 are mounted on the main frame hangers to be described hereinafter.

The left side of the bus, opposite door 15, is provided with a door 19 which is hinged to the body of the bus at its top edge by a hinge 20 in a well known manner. The lower edge of door 19 is provided with a pair of bifurcated latch members 21 which cooperate with a pair of hooks (not shown) similar to hooks 18 to releaseably latch the door 19 closed in a conventional manner. The center portion of door 19 comprises a coarse mesh screening material 22 to permit easy air flow into or out of the high side bay.

A rubber apron 23 is provided on the forward cross member 14 of the high side bay to deflect any road debris that might otherwise hit the bottom of the high side as the bus moves. Suitable holding strips 24 and attaching means 25 are provided to attach the apron to the cross member 14.

The webs of the cross members 14 are provided with insulation 26 and insulation support sheets 27.

A pair of main frame hangers 28 are provided, running lengthwise of the bus and connected to and positioned inwardly of the ends of the cross members 14 defining the high side bay.

Each main frame hanger 28 comprises a front hanger plate 29 which comprises a top vertical plate portion 30 from the lower end of which extends a forwardly and downwardly sloped plate portion 31. Plate portion 30 is in contact with the front surface of the front cross member web 14b. On the rear surface of said cross member web is a reinforcing plate 32. Plate portion 30, cross member 14 and plate 32 are formed with suitable registering openings to receive attaching means such as nut and bolt assemblies 33. At the lower end of plate portion 31, attached by suitable fastening means 34, is an L shaped corner member 35, which comprises an upwardly and rearwardly sloped portion, and a horizontally rearwardly extending portion. Only a part of left front corner member 35 can be seen in FIG. 1, but it will be understood that it is similar to but symmetrically disposed to the corner member 42 of the rear hanger plate 36 now to be described.

The rear hanger plate 36 of each main frame hanger 28 comprises a top vertical plate portion 37 from the lower end of which extends a rearwardly and downwardly sloped plate portion 38. Plate portion 37 is in contact with the front surface of rear cross member web 14b defining the high side bay. On the rear surface of said cross member web is a reinforcing plate 39. Suitable means 40 are provided to attach the plate portion 37, plate 39 and the portion of web 14b therebetween together. At the lower end of plate portion 38, attached by suitable fastening means 41, is an L shaped corner member 42, which comprises an upwardly and forwardly sloped portion 43, and a horizontally forwardly extending portion 44.

Resting on and attached to, by any suitable means not shown, the horizontal portions of the corner members 35 and 42 is an inwardly extending horizontal flange 45 of a hanger support angle iron 46. Each angle 46 also comprises a vertical flange 47 extending upwardly from the outer end of flange 45. Near the rear end of each main frame hanger 28, on the outer surface of flange 47, each angle 46 is provided with a pair of vertical spaced gusset plates 48, between which pass the bus frame end struts 14c to strengthen the structure. Pins 49 are provided to secure the assembly. Another gusset plate or plates may be provided at the front end of frame hanger 28, to be fixed to strut 14c of cross member 14 defining the front of the high side bay. Flange 48 may also be provided with brackets 50, only one being shown in FIG. 1, upon which doors 15 and 19 may be mounted. Flange 45 is provided with brackets 51 upon which the door hooks 18 are mounted.

At its rear end, each main frame hanger 28 is provided with a brace member 52 which runs from plate portion 38 inwardly at an angle, and terminates in a horizontal portion 53 which is attached to cross web 14b by any suitable means such as nut and bolt assemblies 54. The other end of each brace may be attached by the same fastening means 41 which attaches plate portion 38 to corner member 42.

Mounted on the main frame hangers 28, is a main frame 54.

Main frame 54 comprises a pair of I beam members 55 which are parallel to each other. I beams 55 are interconnected at the left side of the bus by a cross beam 56 and at the right side of the bus by a cross beam 57. I beams 55 are also interconnected, intermediate their ends, by a receiver supporting angle bracket 58.

At each end of each I beam 55, main frame 54 is provided with a main frame hanger bracket structure 59. Each structure 59 comprises an end plate 60 which is attached to the end of each of the I beams 55. Attached to end plate 60 is the vertical web 61 of an L shaped bracket, the horizontal flange 62 of which extends outwardly and is disposed over flange 45 of hanger support angle iron 46. A strengthening member 63 is provided which extends upwardly centrally of flange 62 and interconnects the outer end thereof with the portion of plate 60 extending above said flange 62.

There is a hanger bracket structure 59 provided at each of the four corners of the main frame 54, to support the main frame on the hanger brackets 28.

Interposed between the upper surface of flange 45 and the under surface of flange 62 of the hanger bracket structure 59, is a shock mount 64 of a type known as "shipping mount" and sold by the United States Rubber Company. Means 65 may be provided to interconnect the flange 45 of the hanger brackets, the shock mount 64 and the flange 62 of the hanger bracket structure 59.

Mounted within the confines of main frame 54, defined by I beams 55 and left and right cross beams 56 and 57, are a condenser frame assembly 66 and an engine and compressor frame assembly 67. Condenser frame 66 comprises a pair of L shaped support members 68, each having a horizontal flange 69 disposed over the top surface of I beams 55. Suitable shock mounts 70 are interposed between the top surface of the I beams 55 and the undersurface of flange 69. L shaped support members 68 also comprise vertical flanges 71 which extend downwardly from the inner ends of horizontal flanges 69. At the left end of condenser frame 66, is a pillow block supporting assembly 72 which comprises a pair of vertical plates 73 fixed, as by welding or any other suitable means, to the flanges 71 and extending upwardly above flanges 69. A pair of inverted U shaped members 74 interconnect the upper ends of plates 73. Hinged bracing members 75 are provided which strengthen the members 74 against plates 73. Mounted on members 74 are a spaced pair of plates 76 each of which support a pair of pillow blocks 77 for a reason appearing hereinafter.

The left end of condenser assembly 66 comprises a cross member 78 interconnecting the flanges 71.

Other suitable cross members, not shown, are provided to support the air conditioning condenser and air conditioner engine and radiator as will be apparent to those skilled in the art.

Engine and compressor frame 67 comprises a pair of L shaped members 79 which extend parallel to I beams 55 and comprise an upwardly extending flange 80 and a flange 81 extending inwardly from the lower end of flange 80. The ends of the members 79 are interconnected by a right side cross member 82, a left side cross member 83, and a pair of intermediate cross members 84 and 85 which support other components of the air conditioner system as will be described hereinafter.

Engine and compressor frame 67 is provided with four hanger assemblies 86 which are similar to hanger bracket assemblies 59, and each comprise a downwardly extending flange 87 which is affixed to flange 80 of member 79, an outwardly extending flange 88 which extends from the top end of flange 87 and overlies the top flange of I beams 55. Flange 87 is provided with a strengthening member 89 at the upper surface thereof.

Suitable shock mounts 90 are provided between the upper surface of I beams 55 and the undersurface of flange 88, and suitable shock mounts 91 are provided, disposed between the web of I beams 55 and the outside surface of flange 80 of members 79. Suitable bolt means are provided to attach the shock mounts 91 to said I beam web. The undersurface of engine and compressor frame 67 is louvered as at 93 to permit exhaust of air around the engine and compressor downwardly out of the bus.

Mounted within engine and compressor frame 67 on members 83, 84 and other means not shown, is a compressor 94 for the air conditioning system which is itself well known. Compressor 94 is mounted in the left front corner of the engine and compressor frame 67.

Mounted in the right front corner of the frame 67 is a separate Diesel engine 95 which supplies power for the air conditioner system.

Mounted on cross member 84 is a connection 96 to which are connected the shafts of both the compressor 94 and the engine 95. The connection 94 also comprises a V belt pulley 97. Mounted below the engine 95 on cross member 82 and 85 is an oil tank 98 for the separate engine 95.

Figure 3:
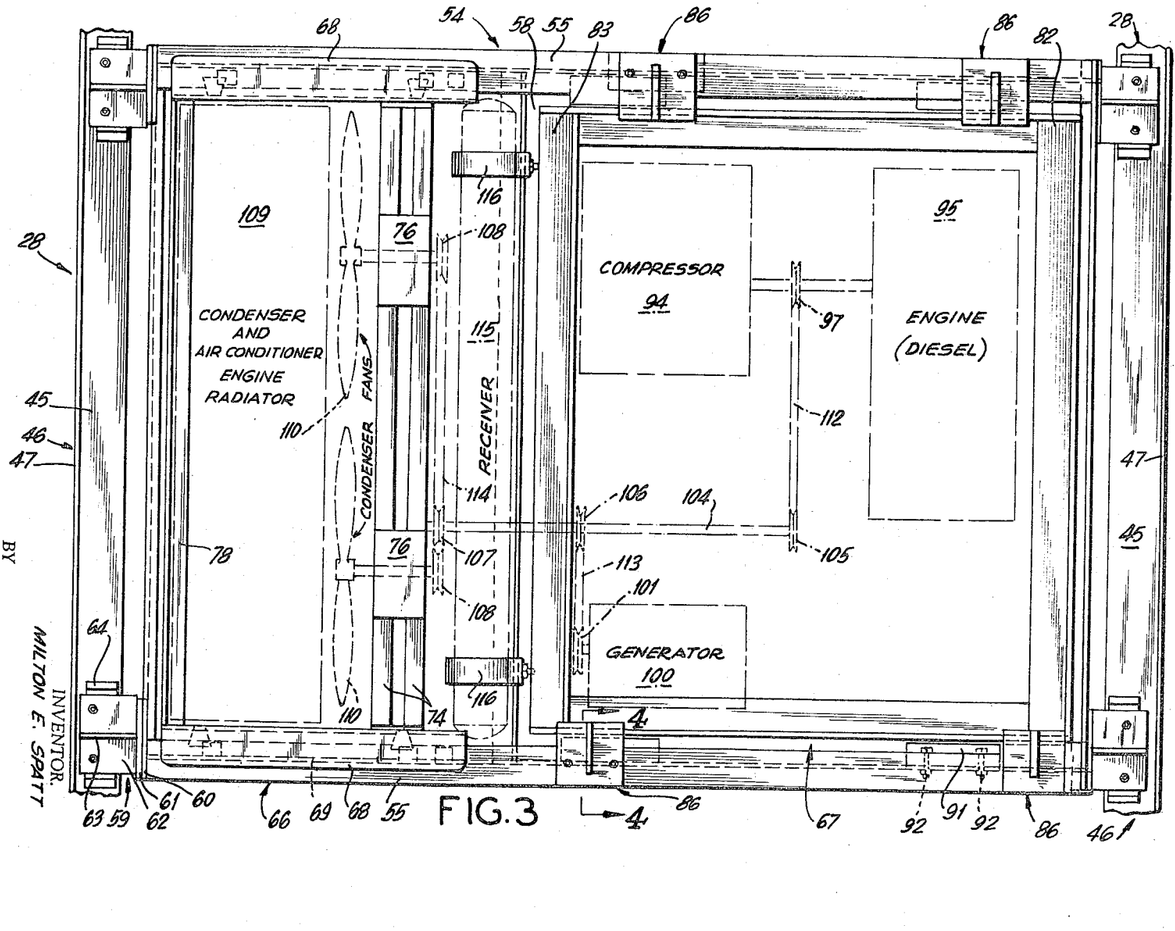
FIG. 3 is a plan view of the high side frame structures with the positions of the high side components and the drive system shown in dot-dash lines.

It will be understood that FIG. 1 shows the frames and their relative location to each other and to the hanger brackets 28, and FIG. 3 shows a plan view of these frames with the positions of the components and the V belt drive train schematically.

Mounted on a suitable adjustable bracket 99 on cross members 83 and 84, is a separate generator 100, whose shaft is provided with a V belt pulley 101. The engine and compressor frame 67 is provided with suitable means 102 on which are mounted jack shaft pillow blocks 103. Rotatably mounted in pillow blocks 103 is a jack shaft 104 having a first V belt pulley 105 in alignment with pulley 97 of the engine and compressor connection 96, a second V belt pulley 106 in alignment with the pulley 101 of the generator 100, and a third V belt pulley 107 in alignment with a pair of V belt pulleys 108. It will be understood that the jack shaft 104 extends to the left outwardly beyond the end of engine and compressor frame 67 and terminates adjacent members 74, whereby a power connection can be made between the engine compressor connection 96 and the generator 100 on the frame 67, and the fans for the condenser and air conditioner engine radiator on the frame 66.

Mounted on said frame 66 is a condenser assembly 109 for the air conditioner system, which also includes cooling coils for the coolant fluid for the separate engine 95. Assembly 109 includes a pair of air moving fans 110 each having a shaft 111 journalled in pillow blocks 77 and terminating in a pulley 108.

A belt 112 interconnects pulleys 97 and 105. A belt 113 interconnects pulleys 106 and 101. A belt 114 interconnects pulley 107 and the pair of pulleys 108 to drive the fans 110.

Thus it will be seen that the drive train is as follows: when the engine 95 is turning, the compressor 94 receives power directly through connection 96, and jack shaft 105 is powered through belt 112. Generator 100 is powered through belt 113 off pulley 106 on jack shaft 104. Condenser fans 110 are powered through belt 114 off pulley 107 on jack shaft 104.

The air conditioner receiver 115 is mounted by brackets 116 on its cross member 58 of the main frame 54.

Disposed rearwardly of high side 10a, is low side 10b which comprises a pair of air intake boxes 117 which are mounted on the floor 11 of the bus and extend thereabove. Air intake boxes 117 may have openings 118 formed in the walls thereof and may have a screened top 119 at the top surface thereof so that the total open space, that is, the total of the area of the holes and the spaces beween the screen top 119, is equal to the openings in the floor 11 over which the boxes are disposed.

Figure 6:
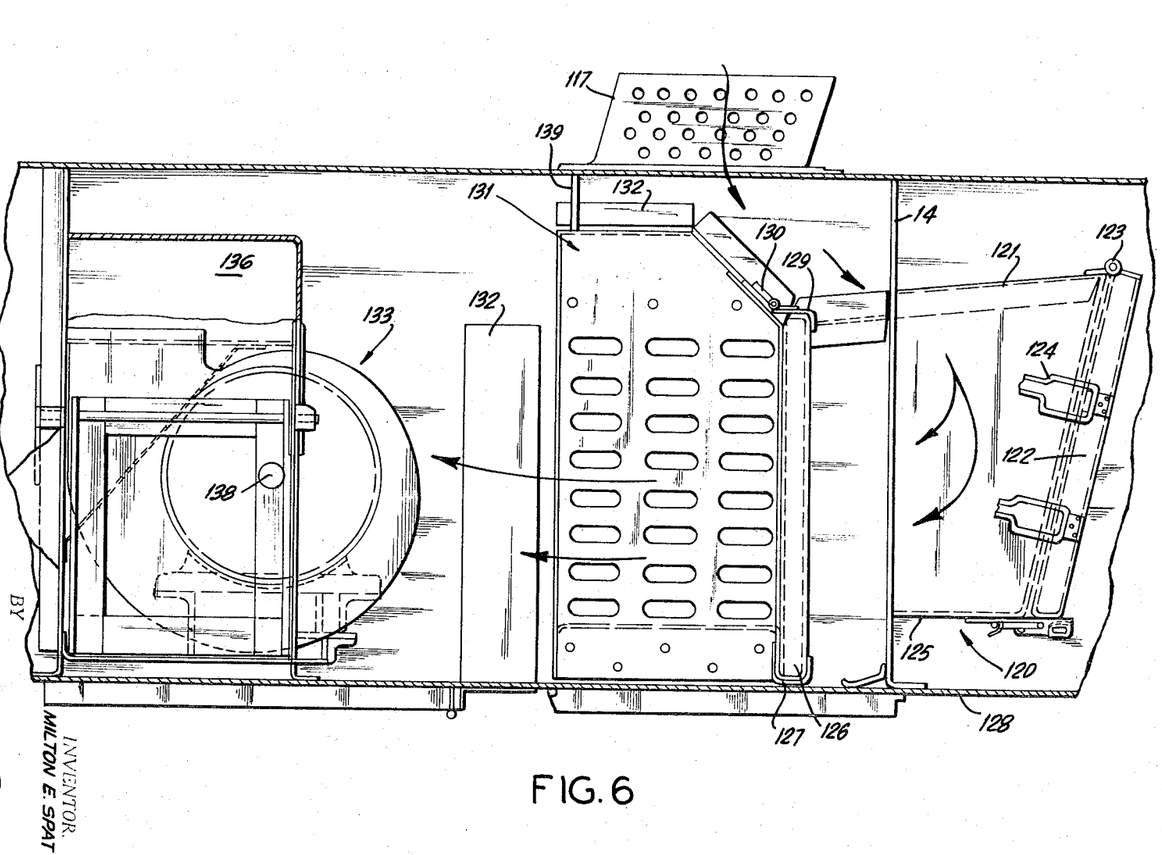
FIG. 6 is a cross-sectional elevational view of part of the plenum chamber and part of the low side.

Under boxes 117 and below the floor 11 is a plenum chamber 120 into which the air intake from the passenger compartment of the vehicle is fed as indicated by the arrow in FIG. 6. The bus may also be provided with fresh air inlets (not shown), so that some fresh air is mixed with the re-circulated air. Plenum chamber 120 comprises a top open wall 121, a front wall 122, the whole of which comprises a door, hinged as at 123, and releasably fastened as at 124, to allow access to the parts, disposed rearwardly of the door 122. Plenum chamber 120 also comprises a bottom wall 125. Plenum chamber 120 passes through a cross member 14 of the bus.

Disposed at the rear end of plenum chamber 120, is an air filter 126 which is supported by a bottom bracket 127 which may be joined to the bottom plate 128 of the bus, and by a top bracket 129 which is hinged as at 130 to allow removal of filters 129 for ordinary maintenance.

The air conditioner evaporator 131 is disposed with its rearwardmost surface in juxtaposition with air filter 126. Suitable brackets and framing members 132 are provided to support the evaporator 131.

Disposed rearwardly of the evaporator 131 is the heat and reheat coil 132, the operation of which will be explained hereinafter.

Disposed rearwardly of coil 132 are a pair of centrifugal evaporator air blowers 133 the outlet ends 134 of which are connected to the existing air distribution system of the bus, only the inlets 136 of which air distribution system are shown in FIG. 2. An inlet duct 136a is fixed to the undersurface of the floor and forms an air passage therewith. Air from the inwardly facing inlets 136 feed duct 136a to carry air to the rear of the vehicle. Between the pair of blowers 133 is an evaporator blower motor 137 the shaft 138 of which extends through the motor and powers both blowers 133.

At the upper end of evaporator 131 a baffle 139 is provided to insure that all the air coming through boxes 117 will pass first into the plenum chamber 120, through the filter 126, through the evaporator 131, through the coil 132, and finally into the vehicle via blower 133, through the air distribution system of the vehicle.

Passing along the right side of low side of 10b is the exhaust pipe 140 which leads from the separate air conditioner engine 95 to a muffler 141 and terminates in an exhaust pipe 142 at the rear of the vehicle. Insulation 143 is provided where the exhaust pipe 140 passes under the low side to protect the air conditioner components. A guard bracket and insulation assembly 144 is provided over the muffler 141. Suitable hanger brackets 145 and guards 146 are provided adjacent exhaust pipe 142.

Figures 4, 5, 5A:
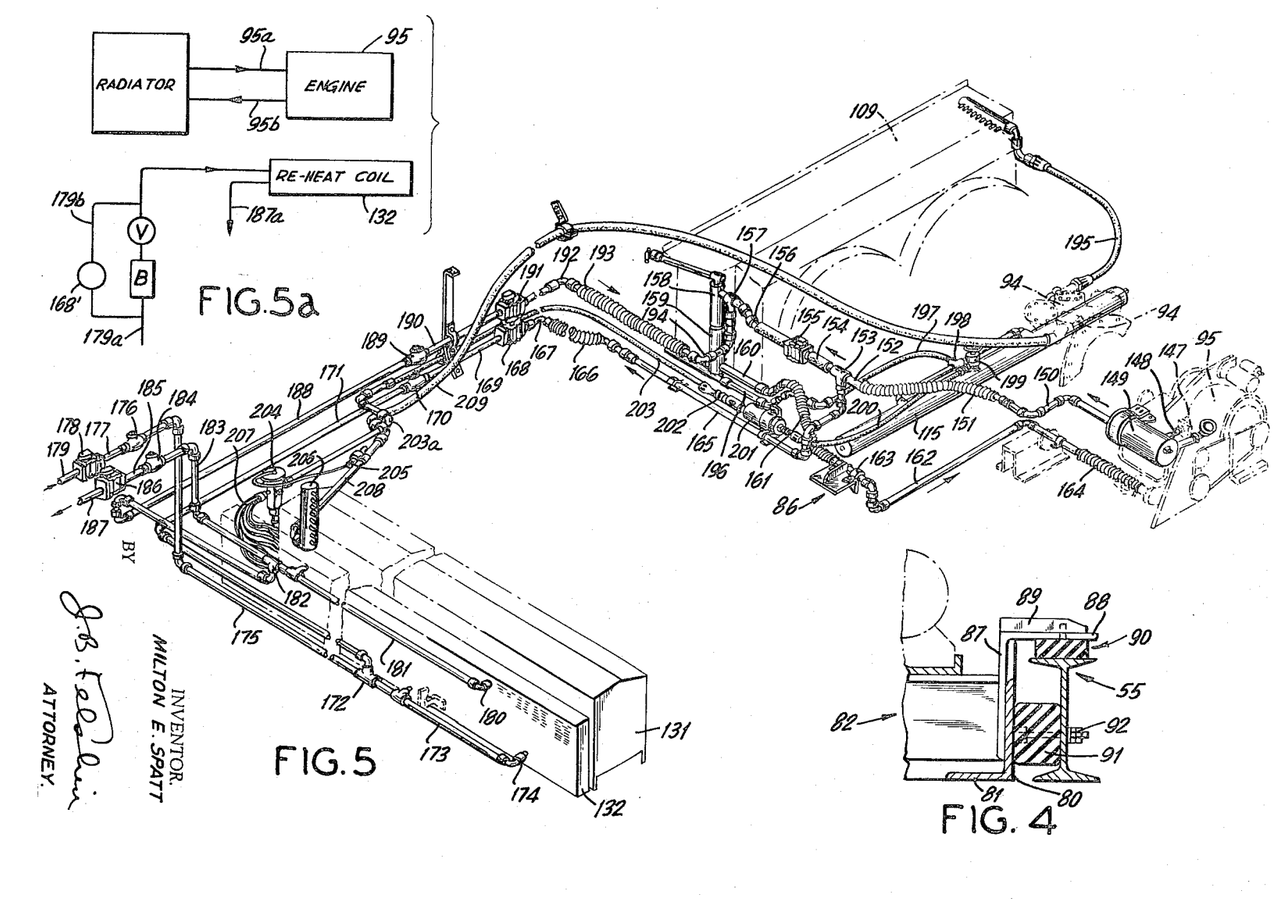
FIG. 4 is a cross-sectional view taken on line 4—4 of FIG. 3.
FIG. 5 is a perspective view of the air conditioner connections with some of the components in dot-dash lines, broken away or removed, looking at the angle of FIG. 1.
FIG. 5a is a schematic showing of an alternate re-heat system.

In FIG. 5 is shown a perspective view of the pipe interconnecting the high and low side air conditioner components with the compressor 94, engine 95, condenser assembly 109, evaporator 131 and the heat and reheat coil 132 shown in dot-dash lines. Extending outwardly from the water jacket outlet 147 of the engine 95 is a short pipe 148 which leads to expansion tank 149. Extending from tank 149 is a pipe 150. Extending from the end of pipe 150 is a flexible hose connection 151. Extending from the other end of hose 151 is a short pipe 152, the other end of which is connected to one arm of a T fitting 153. Extending from the other arm of T fitting 153 is an insulated pipe 154 which connects to one side of a normally open solenoid valve 155. Extending from the other side of solenoid valve 155 is an insulated water line 156 which connects to one arm of a T fitting 157. Connected to the other arm of T fitting 157 is an inlet water header 158. Below water inlet header 158 is an outlet water header 159. Means, not shown, are provided to connect the water headers 158 and 159 to the radiator for the engine 95 within condenser and radiator assembly 109 to cool the water for engine 95.

Connected to the lower end of outlet header 159 is a pipe 160. Connected to the other end of pipe 160 is a flexible hose 161. Connected to the other end of hose 161 is a pipe 162. Pipe 162 is supported by brackets 163 on the hanger bracket assembly 86 which is in the left rear corner of compressor and engine frame 67, as shown in FIG. 1. Attached to the other end of pipe 162 is a flexible hose 163 which connects to the inlet of the water jacket of the separate engine 95.

Thus it will be seen that when solenoid valve 155 is open, cooling water for the engine 95 will circulate between the water jacket of the engine 95 and the radiator for that engine through pipe 148, tank 149, pipe 150, hose 151, pipe 152, fitting 153, pipe 154, valve 155, pipe 156, fitting 157, header 158, through the radiator header 159, pipe 160, hose 161, pipe 162 and hose 164, and back to the water packet of the engine 95.

Means are also provided to divert the water in the aforesaid flow through the heat and reheat coil 132 before returning said cooling water to the engine 95. To this end, a pipe 165 is connected to the center leg of T fitting 153. The other end of pipe 165 is connected to one end of a flexible hose 166. The other end of hose 166 is connected to a short pipe 167. The other end of pipe 167 is connected to a normally closed solenoid valve 168. A pipe 169 joins the outlet of the solenoid valve 168 to a check valve 170. A pipe 171 connects the outlet of the check valve 170 to the center leg of a T fitting 172. A pipe 173 extends from one of the cross legs of T fitting 172 and connects to the inlet 174 of heat and reheat coil 132. The other cross leg of T fitting 172 is connected by a pipe 175 to one side of check valve 176. A pipe 177 connects the other side of check valve 176 to one side of a normally closed solenoid valve 178. The other side of the solenoid valve 178 is connected by a pipe 179 to the coolant system of the main engine which includes its water jacket and water pumps. The outlet 180 of the heat and reheat coil 132 is connected by a pipe 181 to one cross leg of a T fitting 182. The opposite leg of the T fitting 182 is connected by a pipe 183 to the input side of a check valve 184. The output side of said check valve 184 is connected by a pipe 185 to one side of a normally closed solenoid valve 186. A pipe 187 connects the other side of the solenoid valve 186 to the main engine cooling system. The center leg of T fitting 182 is connected by a pipe 188 to the input side of a check valve 189. A pipe 190 connects the output side of a check valve 189 to one side of a normally closed solenoid valve 191. A pipe 192 connects the other side of said solenoid valve 191 to one side of a flexible hose 193, the other side of which is connected by a pipe 194 to the center leg of the T fitting 157.

The mode of operation of the heat and reheat coil 132 is as follows:

When it is desired to operate the air conditioner system at maximum cooling and without reheating, all the valves 155, 168, 191, 186 and 178 are left in their normal condition so that the cooling water from the main engine will flow between the main engine and its radiator and the cooling water from the Diesel engine 95 will flow between the Diesel engine and its radiator and no water will go through the reheat coil 132. When it is desired to reheat, such as to increase the temperature of air which has been cooled down to a degree which would be otherwise uncomfortable for passengers in order to dehumidify the air, the valves 155, 168 and 191 are activated whereby the water will flow from the water jacket of the engine 95 through pipe 150, hose 151, T fitting 153, pipes 165 and 171, through the reheater coil and back through pipe 173, fitting 172, pipe 171, valve 191, pipe 192, hose 193, pipe 194, fitting 157, inlet header 158, through the radiator, through the output header 159, pipe 160, hose 161, pipe 162, hose 164 and back to the water jacket of the engine 95. Whenever the air conditioning system is operating, the valves 178 and 186 will remain inactivated and therefore closed so that no water from the main engine cooling system will get to the heat and reheat coil 132. However, such as for example, in cool weather, the valves 178 and 186 will be activated and thereby put into open condition and the valves 168 and 191 will be left inactive and thereby closed, so that water from the main vehicle engine cooling system will flow through pipe 179, valve 178, pipe 177, valve 176, pipe 175, fitting 172, pipe 173, into coil 132, out of coil 132 through pipe 181, fitting 182, pipe 183, valve 184, pipe 185, valve 186, pipe 187 and back to the main vehicle engine cooling system. This will provide heat for the bus in the ordinary fashion when the air conditioner engine 95 is not operating.

In FIG. 5a, an alternate system is shown schematically. In this system, a pair of pipes 95a and 95b interconnect the water jacket of the engine 95 with only its own radiator in condenser and radiator assembly 109.

Heat and reheat coil 132 is connected by a pair of pipes 187a and 179a to the water jacket of the main vehicle engine. The inlet pipe 179a is provided with a valve V and a booster pump B which are used in cold weather when it is necessary to use coil 132 to heat the vehicle. A pipe 179b by-passes components V and B, and is provided with a normally closed solenoid valve 168'. The coil for this solenoid valve 168' would be incorporated into the electrical system to be described hereinafter in place of coils 155c, 168c and 191c, and the automatic electrical reheat control is otherwise identical to the control as described below, except that the heat for reheating is taken from the main engine coolant instead of from the separate engine coolant. This alternate system is desirable for certain vehicles for reasons well known to those skilled in the art.

The cycle of the working fluid in the air conditioning system is as follows: Starting from compressor 94, the output side of the compressor is connected by a hose 195 to the air conditioner condenser 109. The condensate from the condenser 109 is led through a pipe 196, to a hose 197, to a T fitting 198, into the refrigerant receiver 115. The output of the receiver 115 is controlled by a manual shut off valve 199 which controls the flow from the receiver into a hose 200 which leads into a dryer 201 for the refrigerant. The output side of the dryer is connected to a sight glass 202. A hose 203 connects the other end of the sight glass 202 to a pipe 203a which connects to an expansion valve 204. Valve 204 is controlled in a well known manner by an expansion valve thermal bulb 205 which is connected to the output pipe 206 from the air conditioner evaporator 131. Suitable lines 207 lead from the expansion valve 204 to the input of the evaporator 131. A pipe 208 connects output pipe 206 to a hose 209 which leads to the suction input of the compressor 94 which completes the refrigerant cycle.

At the right side of the vehicle, on the high side bay, a control panel 210 is provided. Also provided but not shown are various electrical controls which are at the driver's console in the vehicle.

Figure 7:
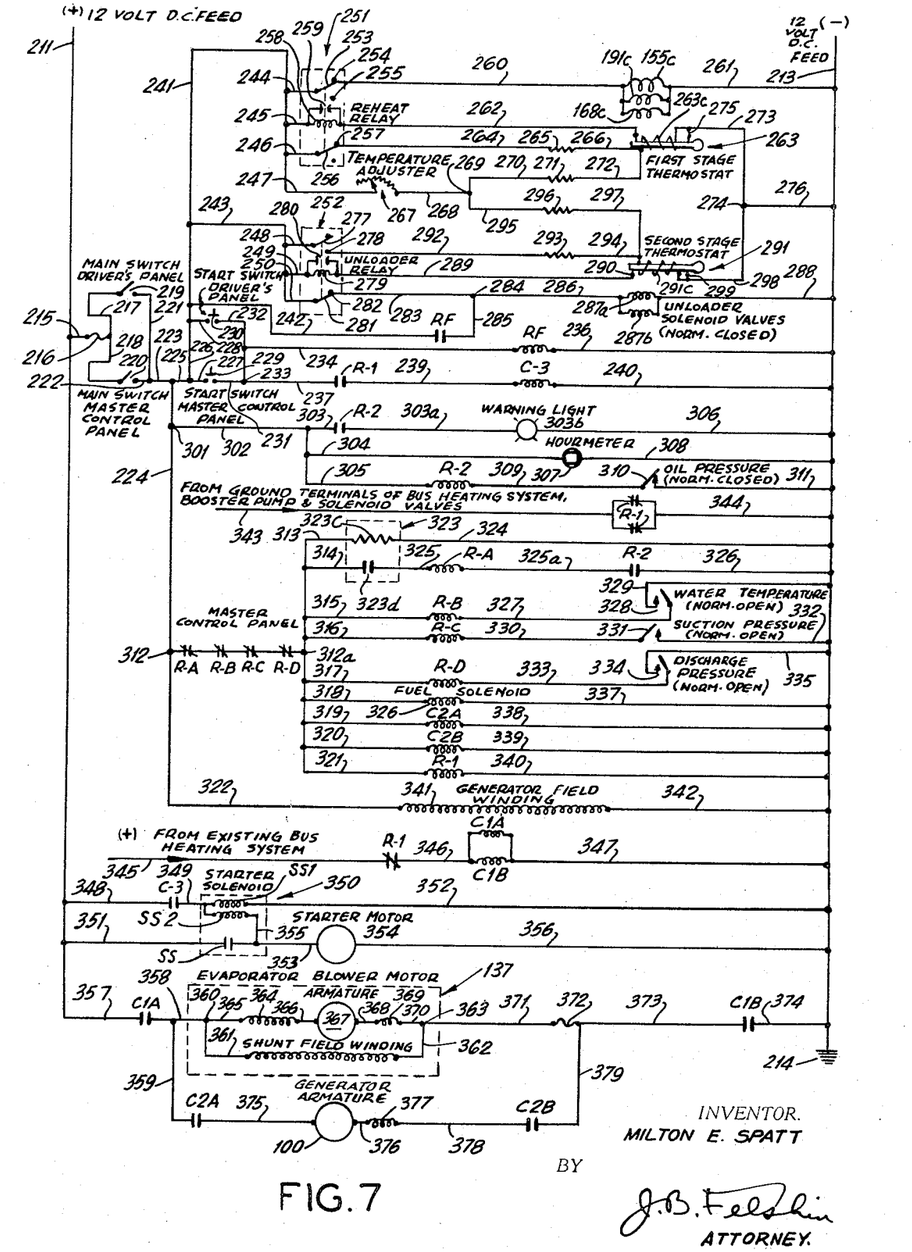
FIG. 7 is a schematic wiring diagram of the control circuits of the air conditioning system.

The operation of the control panel 210 and the other electrical controls will now be described in conjunction with the wiring diagram shown in FIG. 7.

A 12 volt positive DC feed 211 is provided, and a 12 volt negative DC feed 213 is provided. Feed 213 is suitably grounded as at 214 in a well known manner. A line 215 connects from the positive feed 211 to a fuse 216. From the other side of fuse 216 are a pair of lines 217 and 218. Line 217 connects to a manual switch 219 which is in the driver's console. Line 218 connects to a manual switch 220 which is in the master control panel 210. The opposite sides of switch 219 and 220 are connected by lines 221 and 222 to a line 223. Thus it can be seen that the switches 219 and 220 are in parallel and operation of either will supply current to the control circuits now to be described.

Connected to line 223 is a line 224, and a line 225. Connected to line 225 is a line 226. Connected to the juncture of lines 225 and 226 is a line 227. Connected to line 226 is a line 228. At the ends of lines 227 and 228 are a pair of normally open push-button starter switches 229 and 230 respectively. Connected to the opposite sides of switches 229 and 230 are a pair of lines 231 and 232 respectively, joined at a point 233. Thus it can be seen that the two switches 229 and 230 are in parallel and actuation of either will permit current to flow to point 233 and a line 234 connected to line 232 between juncture 233 and switch 230. Line 234 connects to a coil of a relay RF. The other side of said coil is connected by a line 236 to line 213 and to ground. A line 237 connects the juncture 233 to a pair of normally open contacts of a relay R–1, and a line 239 connects the other side of said contacts to a coil of a relay C–3. The other side of said coil of relay C–3 is connected by a line 240 to line 213 and to ground.

Extending from the juncture of lines 226 and 228 is a line 241 to which are connected, in parallel, lines 242, 243, 244, 245, 246 and 247. Said lines 242 through 247, inclusive, receive current upon actuation of either main switch 219 or 220, regardless of the actuation of the starter switches 229 and 230, and supply current to the first and second stage temperature control systems which are now to be described, and the function of which will be described hereinafter.

Line 243 breaks into three lines 248, 249 and 250, in parallel. Line 242 connects to a pair of normally open contacts on the relay RF. Lines 244, 245 and 246 feed into a reheat relay 251. Lines 248, 249 and 250 feed into an unloader relay 252.

Line 244 is joined to the common point of a switch arm 253, which is adapted to contact either contact 254 or contact 255. The switch arm 253 is normally in contact with contact 254. Line 246 connects to the common point of a switch arm 256 which is normally in contact with a contact 257. Line 245 connects to the coil 258 of reheat relay 251. A capacitor 259 is mounted within relay 251 in parallel with coil 258 for reasons well known to those skilled in the art. A line 260 joins contact 254 to one side of coils 155c, 191c and 168c which coils are mounted in parallel. In the modification of FIG. 5a, this line would connect to the coil or solenoid 168' only. A line 261 joins the other common side of the coils 155c, 191c and 168c to ground via line 213. A line 262 joins the other side of coil 258 and capacitor 259 to one contact within a first stage thermostat 263, whose operation will be explained hereinafter. A line 264 connects contact 257 to one side of a resistor 265. A line 266 connects the other side of resistor 265 to one side of a heating coil 263c surrounding the stem of thermostat 263. Line 247 connects to the common point of a temperature adjusting rheostat 267. The winding of rheostat 267 is connected by line 268 to a juncture 269. Extending from juncture 269 is a line 270 which connects to one side of a resistor 271, the other side of which is connected by line 272 to the juncture point of line 266 and coil 263c. A line 273 connects the other side of coil 263c to a juncture point 274. A connection 275 joins the other contact within the bulb of first stage thermostat 263 to the line 273. A line 276 connects juncture 274 to ground via line 213.

The second stage thermostat and its circuitry will now be described. Unloader relay 252 comprises a switch arm 277, the common point of which is connected to line 248. Switch arm 247 is normally out of contact with a contact 278. Line 249 connects to the coil 279 of unloader relay 252, and said coil has a capacitor 280 in parallel therewith. Line 250 connects to the common point of a switch arm 281 which is normally in contact with a contact 282. A line 283 connects contact 282 to a juncture 284. A line 285 connects juncture 284 with the other side of the pair of normally open contacts on the relay RF previously described. A line 286 connects juncture 284 to the coils 287a and 287b of a pair of normally closed compressor unloader solenoid valves, the function of which will be described hereinafter. The coils 287a and 287b are in parallel and the other side of said coils are connected by a line 288 to ground via line 213. A line 289 connects the other side of unloader relay coil 279 and capacitor 280 to one contact 290 within the stem of a second stage thermostat 291. A line 292 connects contact 278 to one side of a resistor 293, the other side of which is connected by a line 294 to one side of a heating coil 291c surrounding the stem of second stage thermostat 291. A line 295 joins juncture 269 to one side of a resistor 296, the other side of which is connected by a line 297 to the juncture point of line 294 and second stage thermostat heating coil 291c. The other side of coil 291c is connected by a line 298 to juncture point 274 and to ground line 213 via line 276. A connection 299 is provided between line 298 and the other contact within the bulb of second stage thermostat 291.

A juncture point 301 is provided in line 224. A line 302 connects juncture point 301 to three lines 303, 304 and 305 which are in parallel and connected on one side to line 302. Line 303 connects to a pair of normally open contacts on a relay R-2, the other side of which is connected by line 303a to a warning light 303b which is connected to ground via line 213 by a line 306. Line 304 is connected to one side of a hourmeter 307, the other side of which is connected to ground via line 213 by a line 308. Line 305 connects to one side of a coil of relay R-2. The other side of the coil of relay R-2 is connected by a line 309 to a normally closed oil pressure gage 310, the other side of which is connected to ground via line 213 by a line 311. Oil pressure gage 310 opens only when oil pressure in the air conditioner Diesel engine 95 is up to normal operating pressure.

Line 224 terminates at juncture 312, interposed in series, in line 224. A line 322 extends from juncture 312. A line extends from juncture 312 to a juncture 312a. Between junctures 312 and 312a are four normally closed pairs of contacts R-A, R-B, R-C and R-D. Extending in parallel between junctures 312a and ground 213 are nine lines 313 through 321, inclusive.

A time delay relay 323 has one side of its coil 323c connected to line 313, and the other side of its coil 323c connected to ground 213 by a line 324. Line 314 connects to one side 213 by a line 340.

Line 322 connects to one side of the generator field winding 341 of the separate generator 100. The other side of winding 341 is connected to ground via line 213 by a line 342.

A line 343 extending from the ground terminals of the bus heating system booster pump and solenoid valves extends to one common side of two pairs of normally closed contacts on relay R-1. These two pairs of contacts are in parallel and their common opposite sides are connected to ground via line 213 by a line 344.

A line 345 extending from the existing bus heating system extends to one side of a pair of normally closed contacts on relay R-1. A line 346 extends from the other side of said normally closed contacts to one common side of the coils of relays C1A and C1B, which coils are in parallel. A line 347 connects the other common side of the coils C1A and C1B to ground via line 213.

A line 348 extends from positive feed 211 to one side of a pair of normally open contacts on a relay C-3. A line 349 extends from the other side of said normally open contacts into a starter solenoid 350 for the Diesel engine 95. A line 351 extends from common positive feed 211 into starter solenoid 350 to one side of a pair of normally open contacts SS which are controlled by the pull-in coil SS1 in starter solenoid 350. Starter solenoid 350 also has a hold-in coil SS2. One side of each of coils SS1 and SS2 are connected to line 349. The other side of coil SS1 is connected to ground via line 213 by a line 352. A line 353 joins the other side of the normally open contacts SS to one side of a pair of normally open contacts 323d on said time delay relay 323. The other side of contacts 323d are connected by a line 325 to one side of the coil of relay R-A. The other side of the coil of relay R-A is connected by a line 325a to a pair of normally open contacts on relay R-2, the other side of which are connected to ground 213 by a line 326. Line 315 connects to one side of the coil of relay R-B, the other side of which is connected by a line 327 to one side of a pair of normally open contacts 328 which are activated by a pre-determined water temperature in the Diesel engine 95. The other side of the contacts 328 are connected by a line 329 to ground via line 213. Line 316 is connected to one side of the coil of relay R-C. The other side of said coil of relay R-C is connected by a line 330 to one side of a pair of normally open contacts 331 operated by suction pressure at the compressor. The other side of the contacts 331 are connected by a line 332 to ground via line 213. Line 317 is connected to one side of the coil of relay R-D, the other side of which coil is connected by a line 333 to one side of a pair of normally open contacts 334 operated by discharge pressure in the air conditioner. The other side of the contacts 334 is connected to ground via line 213 by a line 335. Line 318 is connected to one side of a fuel solenoid 336, the other side of which is connected to ground 213 by a line 337. Line 319 is connected to one side of the coil of a relay C2A, the other side of which is connected to ground 213 by a line 338. Line 320 is connected to one side of the coil of the relay C2B, the other side of which is connected to ground via line 213 by a line 339. Line 321 is connected to one side of the coil of relay R-1, the other side of which is connected to ground via line of a starter motor 354 for engine 95. A line 355 connects the other side of coil SS2 to line 353. Contacts SS, coils SS1 and SS2 and their interconnections are all integral parts of starter solenoid 350. Starter motor 354 is connected to ground via line 213 by a line 356.

A line 357 runs from positive feed 211 to one side of a pair of normally open contacts on relay C1A. A pair of lines 358 and 359 are connected in parallel to the other side of said normally open contacts C1A. Line 358 runs to the evaporator blower motor 137. Line 358 is connected to a junction point 360. One side of the shunt field winding 361 of the evaporator blower motor is connected by line 361 to junction 360. The other side of the winding 361 is connected by line 362 to a junction 363. One side of a series field 364 is connected by line 365 to junction 360, and the other side of said field 364 is connected by a line 366 to one side of the armature 367 of the evaporator blower motor 137. The other side of said armature 367 is connected by line 368 to a compensating field 369, and the other side of said field 369 is connected by a line 370 to junction 363. A line 371 connects junction 363 to one side of a fuse 372. The other side of said fuse 372 is connected by a line 373 to one side of a pair of normally open contacts on a relay C1B. The other side of said contacts C1B is connected by line 374 to ground via line 213. Line 359 is connected to one side of a pair of normally open contacts on a relay C2A. A line 375 connects the other side of said contacts C2A to one side of the armature of the generator 100. The other side of said armature of generator 100 is connected by a line 376 to one side of a compensating field 377, and the other side of said field 377 is connected by a line 378 to one side of a pair of normally open contacts on a relay C2B. The other side of said pair of normally open contacts is connected by a line 379 to the juncture point of line 373 and fuse 372. Both the evaporator blower motor 137 and the generator 100 are compound electric machines, and have three separate fields for reasons well known to those skilled in the art.

*Operation*

The operation will now be explained in conjunction with the schematic electrical drawing of FIG. 7.

The system is started by closing either of the main switches 219 or 220. This immediately causes current to flow through hourmeter 307 through lines 223, 302, 304 and 308 to record running time. The coil of relay R-2 also becomes energized immediately through lines 223, 302, 305, 309, the oil pressure gage 310 which is still in its normally closed condition because oil pressure in the air conditioner Diesel engine has not yet built up, and then to ground via line 311. Current is also supplied through line 224 through the four series connected normally closed contacts of relays R–A, R–B, R–C and R–D, to thereby supply the parallel lines 313 through 321 inclusive. Current through line 313 begins to heat up the coil 323c in time delay relay 323, and then to ground via line 324. The coil of the fuel solenoid 326 is activated through lines 318 and 337 thereby opening the fuel valve and allowing fuel to reach the fuel pump of the Diesel engine 95 of the air conditioner system. The coils of relays C2A, C2B and R–1 are also energized through lines 319, 320 and 321, respectively, and then led to ground through lines 338, 339 and 340, respectively. The activation of the coil of relay R–1 closes the normally open contacts R–1 between lines 237 and 239 to permit activation of the coil of relay C–3 when either of the starter switches 330 or 329 is activated as will be described hereinafter. The energization of the coil of relay R–1 also opens a normally closed contact R–1 on said relay located between lines 345 nad 346 thereby preventing energization of the coils of relays C1A and C1B to keep open the 12 volt direct current circuit to the evaporator blower motor, to be described hereinafter. The contacts on relays C2A and C2B are thereby closed and, since contacts C1A and C1B are open, a closed, isolated circuit is created between the evaporator blower motor 137 and the armature of the generator 100 through lines 376, 378, 379, fuse 372, lines 371, 358, 359 and 375. The activation of the coil of relay R–1 also causes the opening of the normally closed pair of parallel contacts R–1 between lines 343 and 344 to thereby prevent actuation of the booster pump and solenoid valves 178 and 186 to prevent hot water from the main vehicle engine water system from entering the reheat coil 132 when the air conditioner system is in operation. These contacts are also used in the modification shown in FIG. 5a, since these components of the bus heating system are by-passed by pipe 179b as described above.

Actuation of the main switch also permits current to flow through the generator field winding 341 of the air conditioner system generator 100 through junction 312 and lines 322 and 342, to thereby separately excite the generator field of said air conditioner system generator in preparation of producing electricity when the armature of said generator 100 is mechanically rotated by the engine 95 through the belt drive system described above.

Actuation of either of the main switches 219 or 220 also causes current to flow through lines 223, 225, 242, 243 and 241 to supply current to the temperature control system which will be described hereinafter.

The operator then actuates either of the starter switches 229 or 230. This causes the coil of relay RF, located between lines 234 and 236, to become energized to close the normally open contacts RF, located between lines 242 and 285. This causes current to flow through the unloader solenoid valves 287a and 287b of the compressor 94 via lines 242, 285, 286 and 288. Actuation of the solenoid valves 287a and 287b unloads a number of the working cylinders in said compressor, in a well known fashion, to facilitate starting, in a mechanical sense, of the engine 95 and coupled compressor 94. That is, by having no load on some of the cylinders in the compressor, starting the motion of the compressor is made earlier.

Closing of either of the starter switches 229 or 230 also supplies current to the coil of relay C3 via lines 237, 239 and 240, normally open contacts on relay R–1 being closed at this time as described above. Actuation of coil C3 causes normally open contacts C–3, located between lines 348 and 349, to supply current to both coils SS1 and SS2 of the starter solenoid 350. Actuation of pull-in coil SS1 closes normally open contacts SS in the starter solenoid between lines 351 and 353. Only a small current passes through hold-in coil SS2 to starter motor 350 because of the relatively large resistance of coil SS2. This small current breaks the inertial force on the starter motor and starts it moving slowly. A very short time thereafter contacts SS close, to thereby supply full line current to the starter motor 354, via lines 351a, 353 and 356, which in turn starts the separate engine 95, in a well known manner. The two coils in the starter solenoid, therefore, prevent the application of full line current to the starter motor while it is at a complete stand-still, which application could otherwise damage the starter motor.

The starter motor has now started the engine 95, and when the engine is running, the start button 229 or 230, whichever was used, is released. This de-energizes the coils of relays RF and C–3, thereby de-activating the unloader solenoid valves 287a and 287b so that the compressor begins working at full capacity, and also cutting out the starter solenoid 350 and starter motor 354 by way of contacts C–3 returning to their normally open position. The generator armature, mechanically connected, as described above, to the coupling between the compressor and the engine commences to turn to thereby supply current to the evaporator blower motor 137 through the isolated circuit described above. The oil pressure in the engine now builds up to normal, opening normally closed contacts 310 to thereby de-energize the coil of relay R–2 to again open normally open contacts R–2 disposed between lines 303 and 303a to turn off warning light 303b. The warning light 303b warns of low oil pressure and is activated when the engine is started up and will light any time oil pressure should fail due to a mishap in the engine, since when the oil pressure in the engine is below normal, contacts 310 will be closed, coil R–2 thereby energized, contacts R–2 thereby closed to activate the warning light 303b through lines 303a and 306.

During this entire time the coil 323c of the time delay relay 323 has been supplied with current. After some predetermined time, three minutes have been found to be satisfactory, the coil 323c will operate and cause contact 323d to close. During normal operation, however, the engine will be at operating speed by the time the coil 323c becomes sufficiently heated to operate contacts 323d and the coil of relay R–A will still not be supplied with current. Contact 323d remains closed during the entire time the engine is running, and again, if anything should not function properly and oil pressure should fall, actuation of the coil R–2 will cause the closing of normally open contacts R–2 located between lines 325a and 326 which will thereupon supply current to the coil of relay R–A via lines 224, 314, 325, 325a and 326 to thereby shut down operation of the air conditioner system as will be described hereinafter. If a main switch is closed and the engine not started within the predetermined time of the relay 323, coil R–A will become activated and its contacts will cut off current to lines 313 to 321 to prevent continuous supply of current to the various components controlled by these lines. It will be necessary to manually re-set relay R–A before starting the engine. This is one of the components of the safety system in the electrical system of the present invention, the remainder of which will now be described.

As is apparent, operation of the coils of any of the relays R–A, R–B, R–C or R–D will open the corresponding normally closed series connected contacts RA, RB, RC or RD between line 224 and junction 312a to cut off the supply of current to lines 313 through 321 inclusive. Opening of any one of said four contacts will de-activate fuel solenoid 326, cut off the supply of fuel to the engine 95 and, of course, thereby stop the engine, will de-activate the coils of relays C2A and C2B to open the isolated circuit between the generator 100 and the evaporator blower motor 137 to stop the flow of current to the evaporator blower motor, and will deactivate the coil of relay R1 to return contacts R1 between lines 237 and 239 to their normally open condition, which prevents activation of the coil of relay C3, which prevents activation of the starter motor 354 as above described.

Normally closed contacts RA will open as aforedescribed if oil pressure should fall below normal. Normally closed contacts RB will open if water temperature in the engine should rise more than a predetermined amount above normal since this will cause normally open contacts 328 to close to activate coil RB through lines 315, 327 and 329. An abnormal condition in the refrigerant suction pressure will close normally open contacts 331 to thereby actuate coil R–C through lines 316, 330 and 332. An abnormal condition in refrigerant discharge pressure in the air conditioner will close normally open contacts 334 to thereby actuate the coil of relay RD through lines 317, 333 and 335.

When any one of the safety relays RA, RB, RC or RD is actuated, means not shown are actuated to cause a button on the face of that relay which is in the master control panel 210 to pop out. The system cannot be restarted until this button is manually reset. This mechanical holding feature of the contacts of relays RA, RB, RC and RD prevents the endless re-cycling of the particular relay sensing trouble as would occur if the relay operated automatically. That is, if an ordinary relay were used, as soon as its contact was made to open, its coil would be cut off and the contact would close, the coil again activated, the contact again opened, etc., etc., ad infinitum. The button may be appropriately marked to show the driver where the trouble is and the necessity of manually resetting the pop out button is an added safety.

The operation of the temperature control system fed by lines 241 and 243 will now be described.

Before entering upon the detailed description of the operation of the reheat system, it should be understood that the first stage thermostat 263, the reheat relay 251, and the associated wiring and components comprise a primary heat control, in that it controls the flow of heated water from the water jacket of the Diesel engine 95 into the reheat coil 132.

The second stage thermostat 291 and the unloader relay 252, together with the associated components and wiring, comprise a secondary heat control by controlling the unloader solenoid valves 287a and 287b, to cut down the amount of refrigerant operated upon by the compressor 94.

The rheostat 267 in conjunction with the four resistors 265, 271, 296 and 293, as well as the heating coils 263c and 291c interconnect the primary and secondary heat controls to maintain a temperature selected on temperature adjuster rheostat 267 within the passenger compartment of the vehicle.

The thermostats 263 and 291 are similar in construction and operation and are calibrated to maintain a 1° differential in temperature. Each thermostat has a pair of contacts, one at each end, which project into the space within the thermometer bulb and are adapted to be brought into electrical contact via the mercury within the thermometer when the mercury is sufficiently heated and thereby expanded to contact both contacts. The heating coils surrounding the thermometer serve to supply a predetermined fixed amount of heat, controlled by the resistance selected in rheostat 267, or this resistance in combination with the resistors 265 and 293, to thereby keep the mercury at a correspondingly expanded level.

By way of example, it may be assumed that the rheostat 267 is calibrated in conjunction with the four resistors, the two heating coils, and the two thermostats 263 and 291 to maintain the temperature within the vehicle between 69° F. and 78° F. For this purpose, the dial of the rheostat may be provided with numbers 1 through 10, number 1 corresponding to 69° F., number 10 corresponding to 78° F. and numbers 2 through 9 corresponding to respective temperatures between these limits.

Thermostats 263 and 291 are mounted within air return boxes 117 so that they will sense the temperature of the air within the bus on the return portion of its cycle. Assume the bus is just being taken out of the garage and it is desired to cool it before passengers board for their trip. All the systems are operating as described above. It may be assumed rheostat 267 is set at 69° for maximum cooling. Current will be flowing through the coil 258 of reheat relay 251 because the mercury in thermostat 263 will be sufficiently expanded, by the hot air in the bus, to interconnect lines 262 and 273 and thereby complete the circuit through said coil 258 as follows: positive feed 211, line 215, fuse 216, either main switch 219 or 220, line 223, line 225, line 241, line 245, coil 258, line 262, through the mercury in thermostat 263, line 273, junction 274, line 276 and ground via line 213. Actuation of coil 258 causes switch arm 253 to move off contact 254 thereby de-activating coils 155c, 191c and 168c, or the coil of solenoid valve 168' in the modification of FIG. 5a, so that no heated water is passing through the reheat coil. Similarly, switch arm 256 is out of contact with contact 257, current is supplied to the heating coil 263c of thermostat 263, through lines 241 and 247, rheostat 267, line 268, juncture 269, line 270, resistor 271, line 262, line 273 and to ground as aforedescribed.

Since the temperature in the bus is, at this time in the example, well above comfortable temperature, the coil 279 of unloader relay 252 is also activated via lines 243, 249 and 289, through the mercury in thermostat 291, line 298, juncture 274, line 276 and to ground via line 213. Actuation of coil 279 causes switch arm 281 to move out of contact with contact 282 to thereby de-actuate unloader solenoid valve coils 287a and 287b, so that the compressor 94 will operate on all cylinders as described above; contacts RF being open since the starter switches have been released by this time.

Actuation of coil 279 also moves switch arm 277 into contact with contact 278 to allow flow of current through lines 243, 248 and 292, resistor 293, line 294, coil 291, line 298 and to ground as described above.

Assuming now that the air conditioner has operated long enough to bring the temperature in the passenger compartment down to a comfortable degree, the first thing that will happen will be that the circuit through coil 258 will be broken because the heat supplied to the coil 263c is less than the heat supplied to the coil 291c. Of course, the mercury in the two thermostats 263 and 291 will contract at the same rate as the return air cools, but the base heat supplied to coil 263c being less than the heat supplied to the secondary heat control thermostat coil 291c, the same rate of contraction of the mercury will cause breaking of the circuit through the mercury of the primary thermostat before breaking of the circuit through the mercury of the secondary thermostat. The base heat supplied to coil 291c is more than that supplied to coil 263c because of the relationship in values of the resistors 265, 271, 296 and 293. For example, these values may be; for resistor 265, 700 ohms; for resistors 271 and 296, 300 ohms each; and for resistor 293, 2,000 ohms.

These two base heats supplied to the two coils 263c and 291c are controlled by the four resistors and the rheostat 267. Line 268, the current to which is controlled by rheostat 267, feeds into two parallel circuits, each one of which controls the current through each of the coils 263c and 291c, respectively. The current supplied to coil 263c will be determined by the equivalent resistance of the circuit containing the resistors 265, 271 and the rheostat 267, when coil 258 of reheat relay 251 is not actuated to bring resistor 265 into the circuit. The current supplied to the coil 291c will be determined by the equivalent resistance of the circuit comprising the resistors 293, 296 and the rheostat 267, when coil 279 of the unloader relay 252 is actuated to bring resistor 293 into the circuit.

During the cooling off period, when maximum cooling is desired, the circuit between rheostat 267, resistor 271 and the heater coil of the reheat thermostat contains such resistance as will permit only a small amount of heat to be generated in said heater coil, thereby allowing for anticipation as temperature drops. During this same cooling off period, resistor 293 will be in the circuit supplying current to coil 291c. The resultant resistance for coil 291c will be somewhat less than the sum of the resistances of the rheostat and the resistor 296, and will thereby permit a greater current to flow through the coil 291c thereby generating more heat in that coil and preventing a too rapid contraction of the mercury in thermostat 291 to thereby prevent rapid short-cycling of the unloader solenoid valves 287a and 287b.

Now assuming the temperature has dropped to within 1° of preset temperature on rheostat 267, the mercury in thermostat 263 will contract, thereby de-actuating reheat relay 251 to thereby allow reheating by actuation of switch arm 253 to its normally closed position to permit current flow through the coils of solenoid valves 155c, 191c and 168c, or coil 168' if FIG. 5a is used.

The reheat water will then supply heat to the air being forced into the passenger compartment of the vehicle. This will cause the temperature to increase until the mercury in thermostat 263 again expands sufficiently to complete the circuit through coil 258 as aforedescribed, which cuts out the reheat by deactuating coils 155c, 191c and 168c, or coil 168' if FIG. 5a is used.

In normal operation, the primary heat control is sufficient to maintain the temperature of the air within one degree of the present temperature.

However, if the cooling demand is so light, such as if the weather should cool, that the primary temperature control above described by means of reheat cannot raise the temperature sufficiently, then the secondary heat control will come into play since the mercury in thermostat 291 will only then contract sufficiently to break the circuit supplying coil 279 of unloader relay 252. When coil 279 is de-actuated, switch arm 281 returns to its normally closed position to thereby activate unloader solenoid valves 287a and 287b so that the compressor will operate on less than all of its cylinders and thereby cool less.

It is to be noted that under usual conditions, the primary heat control, that is, the supply of reheat water, from whatever source, coupled with the removal of additional heat from the heater coil 263c by the changing of the resistance in the circuit supplying current to said coil causes rapid cycling of the reheat solenoid valves, without any cycling of the compressor unloader solenoid valves, to thereby maintain extremely constant temperature control of the air in the passenger compartment. This cuts down wear on the compressor to prolong its life.

The evaporator blower motor 137 is also used when the air conditioner is not being used to heat and/or ventilate the passenger compartment. Means in the vehicle heating system, not shown, are provided to feed current to line 345. Normally closed contacts R-1 are closed since the air conditioner system is not being used. Current in lines 345, 346, and 347 activates coils C1A and C1B to close normally open contacts C1A and C1B between lines 357 and 358, and 373 and 374, respectively, which connects the evaporator blower motor 137 across lines 211 and 213 to supply said motor with 12 volt direct current from the vehicle electrical system. Since this voltage is less than the voltage produced by generator 100, which is preferably 36 volts D. C., the evaporator blower motor 137 will run at a slower speed when used for heating and/or ventilating than the speed it has when it is used for air conditioning. The slower speed at this time is advantageous since less air is required for heating and/or ventilating than is required for air conditioning.

The generator is cut out at this time since switches 219 and 220 are both open, no current is fed to the coils of relays C2A and C2B, and the contacts of these relays interposed between lines 359 and 375, and 378 and 379, respectively, are in their normally open condition.

It will thus be seen that there is provided an apparatus and article in which the several objects of this invention are achieved, and which is well adapted to meet the conditions of practical use.

As possible embodiments might be made of the above invention, and as various changes might be made in the embodiments above set forth, it is to be understood that all matter herein set forth and shown in the accompanying drawings, is to be interpreted as illustrative and not in a limiting sense.

I claim:

1. In combination, a passenger vehicle having a body provided with a floor, a power drive for said vehicle, including an engine, and a vehicle electrical system comprising means, driven by said engine, to generate electric current, an airconditioning system for the body of said vehicle, comprising a separate engine, a compressor, drive means connecting the separate engine to the compressor for driving the latter, a condenser, blower means for said condenser, separate means to generate electric current, drive means connecting said separate engine to said separate means to generate electric current, an evaporator, evaporator blower means for said evaporator, electric motor means for operating said evaporator blower means, means to selectively supply electric current to said evaporator blower motor means from the vehicle electrical system, and produce a relatively lesser volume of air for heating or ventilating, or from said air-conditioning system separate means to generate electric current, and produce a relatively greater volume of air for air conditioning, a receiver for refrigerant, conduit means connecting the outlet of the receiver to the inlet of the evaporator, and expansion valve in said conduit means, conduit means connecting the outlet of the evaporator to the inlet of said compressor, conduit means connecting the outlet of the compressor to the inlet of said condenser, and conduit means connecting the outlet of the condenser to the inlet of the receiver; and means supported by the body of the vehicle to mount said separate engine, said compressor, said drive means connecting said separate engine and compressor, said condenser, said condenser blower means, said separate means to generate electric current, said drive means connecting said separate engine and electric current generating means, said evaporator, said evaporator blower means, and said electric motor means, beneath the floor of the vehicle.

2. In combination, a passenger vehicle having a body provided with a floor, a power drive for said vehicle including an engine, and a vehicle electric system comprising means driven by said engine, to generate electric current, an air conditioning system for the body of said vehicle comprising a high side and a low side, said high side comprising a separate engine, separate means driven by said separate engine to generate electric current, said low side comprising an evaporator, evaporator blower means for said evaporator, electric motor means for operating said evaporator blower means, means on the vehicle body to support said high side of said air conditioning system beneath the floor of the vehicle, means on said vehicle body to support the low side of said air conditioning system below the floor of said vehicle, means to selectively supply electric current to said evaporator blower motor means from the vehicle electric system and produce a relatively lesser volume of air for heating or ventilating the vehicle body, or from said air conditioning system separate means to generate electric current and produce a relatively greater volume of air for air conditioning the vehicle body, air distributing means for said vehicle body disposed above the floor within said body, means to connect the air outlet of the low side of said air conditioning system to said air distributing means, and means for recirculating air from the inside of the vehicle body through said floor to the low side of said air conditioning system.

3. The combination of claim 2, said high side supporting means comprising a pair of hanger brackets, means to attach said hanger brackets to the vehicle below the floor thereof, a main frame mounted by shock mount means on said hanger brackets, a pair of frames separately mounted by shock mount means, on said main frame, said high side further comprising a compressor, a condenser and condenser blower means; means to mount said separate engine, said compressor and said separate means to generate electric current, on one of said pair of frames; and means to mount said condenser and said condenser blower means on the other of said pair of frames.

4. In combination, a passenger vehicle having a body provided with a floor, a power drive for said vehicle, including an engine, and a vehicle electrical system comprising means, driven by said engine, to generate electric current, an air-conditioning system for the body of said vehicle, comprising a separate engine, a compressor, drive means connecting the separate engine to the compressor for driving the latter, a condenser, blower means for said condenser, separate means to generate electric current, drive means connecting said separate engine to said separate means to generate electric current, an evaporator, evaporator blower means for said evaporator, electric motor means for operating said evaporator blower means, means to selectively supply electric current to said evaporator blower motor means from the vehicle electrical system, and produce a relatively lesser volume of air for heating or ventilating, or from said air-conditioning system separate means to generate electric current, and produce a relatively greater volume of air for air conditioning, a receiver for refrigerant, conduit means connecting the outlet of the receiver to the inlet of the evaporator, an expansion valve in said conduit means, conduit means connecting the outlet of the evaporator to the inlet of said compressor, conduit means connecting the outlet of the compressor to the inlet of said condenser, and conduit means connecting the outlet of the condenser to the inlet of the receiver, said air conditioning system comprising re-heat means, means to unload said compressor, first electrical means controlling said re-heat means to supply heat to the air being conditioned when said first electrical means is activated, a second electrical means to control said compressor unloading means, to reduce the amount of refrigerant operated upon by said compressor when said second electrical means is activated, a control circuit to automatically connect and disconnect said first and second electrical means to a source of current, said control circuit comprising first and second thermostat means, said control circuit further comprising means operable by said first thermostat means to deactive said first electrical means when the temperature of the air being conditioned is greater than a first predetermined temperature, said control circuit further comprising means operable by said second thermostat means to activate said second electrical means when the temperature of the air being conditioned is less than a second predetermined temperature less than said first predetermined temperature.

5. The combination of claim 4, said control circuit comprising means to simultaneously vary said first and second predetermined temperatures at which said first and second thermostat means actuate, while maintaining a predetermined relation between said first and second predetermined temperatures.

6. An air conditioner system comprising a refrigerant compressor, an engine, means to drivingly connect said engine to said compressor, an electrical starter motor for said engine, main switch means and starter switch means for said system, means to sense the pressure of oil in said engine, said oil pressure sensing means including a pair of normally closed contacts and means to open said contacts when oil pressure is above a predetermined pressure, safety circuit means having means adapted to stop operation of said engine and said air conditioner system upon actuation thereof of said safety circuit means, said safety circuit means including a first relay, said first relay comprising a coil and a pair of normally open contacts adapted to be closed when said coil is activated, said first relay coil being in series circuit with said oil pressure sensing means contacts, said safety circuit means including a time delay relay, said time delay relay comprising a pair of normally open contacts and a coil adapted to close said last mentioned contacts after said coil has received current for a predetermined period of time, means to supply current to said coil of said time delay relay when said main switch means is closed, said safety circuit stopping means comprising a first safety relay comprising a coil and a pair of normally closed contacts controlled by said coil; and means to connect said first safety relay contacts, said time delay relay contacts, said first safety relay coil, and said first relay contacts, in series, to a source of current controlled by said main switch means.

7. The combination of claim 6, said first safety relay contacts comprising mechanical means to hold said contacts in the open condition when said contacts are opened.

8. An air conditioner system comprising re-heat means and a refrigerant compressor, compressor unloading means, first electrical means controlling said re-heat means to supply heat to the air being conditioned when said first electrical means is activated, second electrical means to control said compressor unloading means, to reduce the amount of refrigerant operated upon by said compressor when said second electrical means is activated, a control circuit to automatically connect and disconnect said first and second electrical means to a source of current, said control circuit comprising a first relay means and a second relay means, each of said relay means comprising a coil and a pair of switch arms adapted to be moved away from their normal position upon actuation of said coils respectively, both said switch arms of said first relay means being normally closed, one of said switch arms of said second relay means being normally open and the other switch arm thereof being normally closed, one side of said switch arms and said coils of both said relay means being connected to said source of current, said control circuit further comprising variable electrical resistance means having one side connected to said source of current, said control circuit further comprising first and second thermostat means each comprising a bulb having a substance therein expansible in response to the application of heat and electro-conductive, a pair of contacts extending into said bulb and adaptable to be electrically connected to each other via said substance when said substance is sufficiently expanded to contact both said contacts, each of said thermostat means further comprising a heating coil surrounding said bulb, said first and second thermostats being located within the system so as to sense the temperature of the air being conditioned, first means to electrically connect said re-heat means to the other side of one of said switch arms of said first relay means, second means to electrically connect the other side of said coil of said first relay means to one contact within said first thermostat means, third means to electrically connect the other side of said second switch arm of said first relay means to one side of said heating coil of said first thermostat means, fourth means to electrically connect the other side of said variable resistance means to said one side of said heating coil of said first thermostat means, fifth means to electrically connect said other side of said variable resistance means to one side of said heating coil of said second thermostat means, sixth means to electrically connect the other side of said normally open switch arm of said second relay means to said one side of said heating coil of said second thermostat means, seventh means to electrically connect the other side of said coil of said second relay means to one contact within said bulb of said second thermostat means, eighth means to electrically connect the other side of said normally closed switch arm of said second relay means to said second electrical means, first, second, third and fourth fixed electrical resistance means interposed in said third, fourth, fifth and sixth electrical connection means respectively, said first fixed resistance means being less than said fourth fixed resistance means, said second and third fixed resistance means being substantially equal to each other and each being smaller than said first fixed resistance means; and circuit completion means connected to the other sides of said first and second electrical means and the second contacts and the other sides of the heating coils of said first and second thermostat means.

References Cited

UNITED STATES PATENTS 2,341,781  2/1944  Hornaday __________ 165—43

ROBERT A. O'LEARY, *Primary Examiner.*

CHARLES SUKALO, *Examiner.*